United States Patent
Zaslavsky et al.

(10) Patent No.: US 10,454,967 B1
(45) Date of Patent: Oct. 22, 2019

(54) CLUSTERING COMPUTER SECURITY ATTACKS BY THREAT ACTOR BASED ON ATTACK FEATURES

(71) Applicant: EMC IP Holding Company LLC, Hopkinton, MA (US)

(72) Inventors: Alex Zaslavsky, Petah tikva (IL); Oren Karmi, Tel-Aviv (IL); Uri Fleyder, Giv'at Shmuel (IL); Lior Ben-Porat, Petah-Tiqwa (IL); Marcelo Blatt, Modiin (IL)

(73) Assignee: EMC IP Holding Company LLC, Hopkinton, MA (US)

(*) Notice: Subject to any disclaimer, the term of this patent is extended or adjusted under 35 U.S.C. 154(b) by 470 days.

(21) Appl. No.: 14/865,451

(22) Filed: Sep. 25, 2015

(51) Int. Cl.
*H04L 9/00* (2006.01)
*H04L 29/06* (2006.01)

(52) U.S. Cl.
CPC ........ *H04L 63/1441* (2013.01); *H04L 63/145* (2013.01); *H04L 63/1483* (2013.01); *H04L 63/20* (2013.01)

(58) Field of Classification Search
CPC .................................................. H04L 63/1441
See application file for complete search history.

(56) References Cited

U.S. PATENT DOCUMENTS

| 8,881,281 B1* | 11/2014 | Mitchell | ............. | H04L 63/1425 709/217 |
| 2015/0096023 A1* | 4/2015 | Mesdaq | ................ | H04L 63/145 726/23 |

OTHER PUBLICATIONS

Britt et al., Clustering Potential Phishing Websites Using DeepMD5, In USENIX Conference on Large-Scale Exploits and Emergent Threats, 2012.

* cited by examiner

*Primary Examiner* — Ashokkumar B Patel
*Assistant Examiner* — Syed M Ahsan
(74) *Attorney, Agent, or Firm* — Ryan, Mason & Lewis, LLP

(57) ABSTRACT

Clustering is provided of computer security attacks by the threat actor based on features of the attacks. Attack data is obtained for a given attack and a plurality of features of the given attack are extracted from a plurality of attack attributes. A feature-based score is computed for the given attack based on the extracted features relative to each of a plurality of attack clusters. Each attack cluster is comprised of a plurality of attacks performed by a particular attacker. The given computer security attack is assigned to a particular attack cluster if the feature-based score for the particular attack satisfies a predefined score criteria.

22 Claims, 4 Drawing Sheets

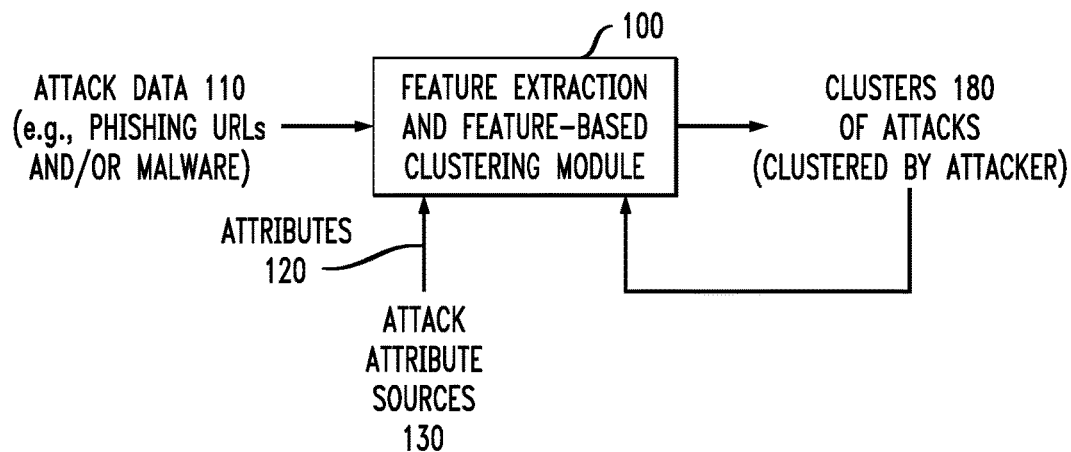

| ATTACK ATTRIBUTE SOURCES 130 (PHISHING ATTACK) | ATTRIBUTES 120 |
|---|---|
| 130-1 PHISHING EMAIL MESSAGE | SENDER EMAIL ADDRESS<br>PHISHING URL<br>HEADERS (FROM, DATE, SUBJECT) |
| 130-2 PHISHING URL | PHISHING KIT (ARCHIVED)<br>REQUIRED INPUT FIELDS<br>NUMBER OF PAGES<br>WHOIS RECORDS (IP/ISP/LOCATION + DOMAIN)<br>HTML RECORDS (ZIP + HASH)<br>REDIRECTION URL |
| 130-3 PHISHING KIT | ZIP + HASH + DIRECTORY TREE<br>EMAIL ADDRESSES (WHICH ACT AS DROP ZONE) |
| 130-4 RSA FraudAction™ INTELLIGENCE | EMAIL ADDRESS<br>IP ADDRESS |
| 130-5 ANTI-FRAUD COMMAND CENTER™ (AFCC) PHISHING HISTORY | PHISHING URL |
| 130-6 RSA eFraudNetwork™ | SUSPECT IP ADDRESS |

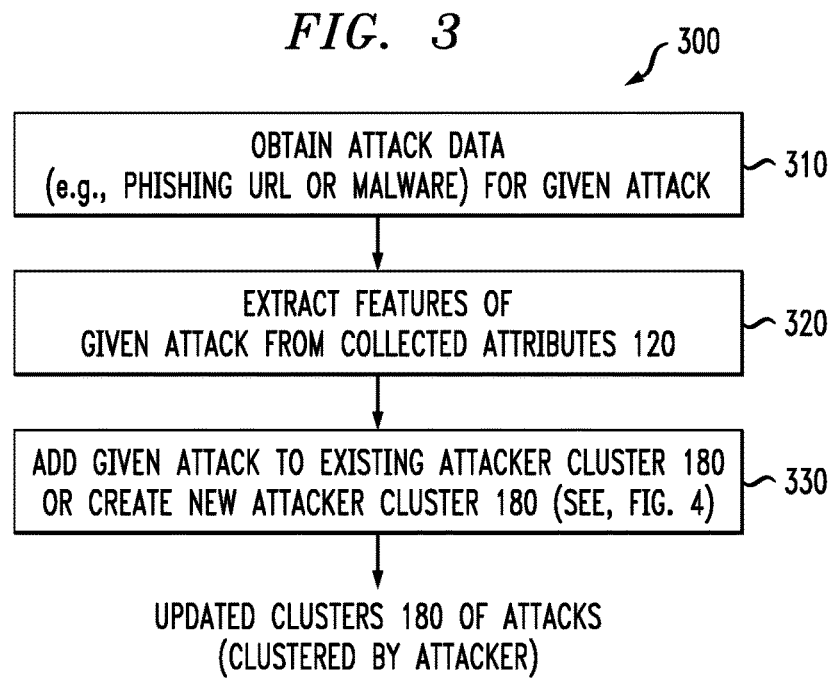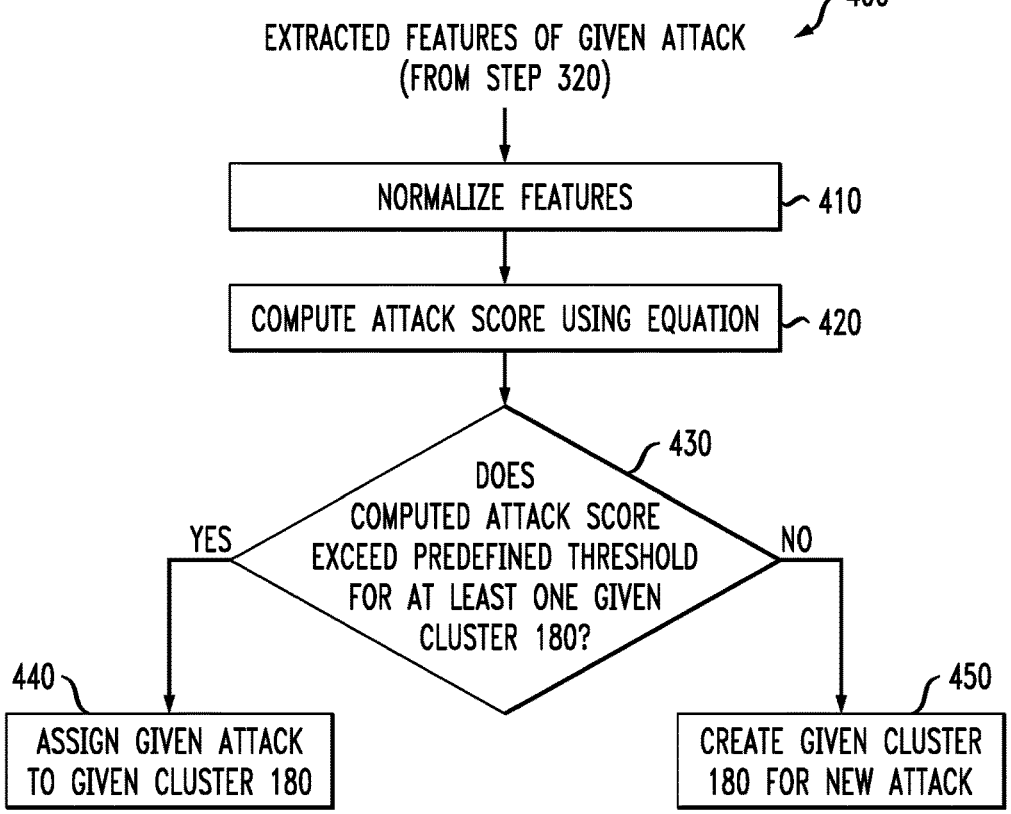

| Phishing URL ~510 | ID ~520 | email ~530 | IP ~540 |
|---|---|---|---|
| http://10dallars.com.au/wp-admin/nav/nav.htm | 1 | biiiib3@gmail.com,php_info@ymail.com,phphack29@gmail.com | 122.201.108.72 |
| http://alo.lu/modules/mod_poll/mod_poll.php | 2 | biiiib3@gmail.com,php_info@ymail.com | 85.93.210.131 |
| http://grupocolba.com/modules/mod_wrapper/file/index.htm | 3 | nan | 190.253.113.252 |
| http://grupocolba.com/modules/mod_wrapper/Yahoo/log_verif.htm | 4 | biiiib3@gmail.com,php_info@ymail.com | 190.253.113.252 |
| http://grupocolba.com/modules/mod_wrapper/Yahoo/log_verif.htm | 5 | biiiib3@gmail.com,php_info@ymail.com | 190.253.113.252 |
| http://phonebooker.co.uk/roseindienne/images/untitled/navy2015new/logon.html | 6 | nan | 83.170.122.28 |
| http://phonebooker.co.uk/roseindienne/images/untitled/navy2015new/logon.html | 7 | nan | 83.170.122.28 |
| http://phonebooker.co.uk/taprescue/images/navy2015new/logon.html | 8 | biiiib3@gmail.com,rodneykalif@gmail.com | 83.170.122.28 |
| http://phonebooker.co.uk/taprescue/images/navy2015new/logon.html | 9 | biiiib3@gmail.com,rodneykalif@gmail.com | 83.170.122.28 |

CLUSTERING COMPUTER SECURITY ATTACKS BY THREAT ACTOR BASED ON ATTACK FEATURES

FIELD

The field relates generally to computer security techniques, and more particularly to techniques for clustering computer security attacks, such as malware and phishing attacks, by attacker based on features of the attack.

BACKGROUND

Malware (i.e., malicious software) and phishing are common computer security risks. Malware is software used to disrupt computer operations, gather sensitive information, and/or gain access to a computing device. Phishing attempts to obtain sensitive information, such as user names, passwords and/or financial details, typically for malicious reasons, by impersonating a trustworthy entity in an electronic communication. Malware and phishing attacks are performed by an attacker (e.g., an individual or an entity) that hopes to obtain personal information or to access a computing device.

Organizations that are victims of computer security attacks often aim to identify the attackers in an attempt to reduce the business damage, monetary losses and/or damage to the business reputation. A need exists for techniques to associate a set of computer security attacks with a particular attacker.

SUMMARY

One or more illustrative embodiments of the present invention cluster a plurality of computer security attacks by the attacker (i.e., the threat actor) based on features of the computer security attacks. In accordance with one embodiment of the invention, a method is provided comprising the steps of obtaining attack data for a given computer security attack; extracting a plurality of features of the given computer security attack from a plurality of attributes of the given computer security attack collected from a plurality of sources; computing a feature-based score for the given computer security attack based on the extracted features of the given computer security attack relative to a given one of a plurality of attack clusters, wherein the given attack cluster is comprised of a plurality of attacks performed by a particular attacker; assigning the given computer security attack to the given attack cluster if the feature-based score for the given computer security attack satisfies one or more predefined score criteria; and providing the plurality of attack clusters comprised of a plurality of attacks performed by a corresponding attacker.

In one or more exemplary embodiments, the given computer security attack comprises one or more of a malware attack and a phishing attack and the obtained attack data comprises one or more of malware associated with the malware attack and a phishing URL, respectively.

In at least one embodiment, the predefined score criteria require that the feature-based score for the given computer security attack exceeds a predefined threshold. In one variation, the predefined score criteria require that the feature-based score for the given computer security attack relative to the given existing attack cluster has a maximum value relative to the feature-based scores for the given computer security attack for the plurality of existing attack clusters.

In one or more exemplary embodiments, the feature-based score for the given computer security attack aggregates a feature score for a plurality of the extracted features of the given computer security attack based on a comparison to a corresponding feature of the given attack cluster.

The methods and devices of the illustrative embodiments overcome one or more of the problems associated with conventional techniques, and provide for feature-based clustering of attack data to associate a set of computer security attacks (e.g., phishing and/or malware attacks) with a particular attacker. These and other features and advantages of the present invention will become more readily apparent from the accompanying drawings and the following detailed description.

BRIEF DESCRIPTION OF THE DRAWINGS

FIG. 1 illustrates an exemplary feature extraction and feature-based clustering module in accordance with one embodiment of the invention;

FIG. 2 is a sample table indicating a listing of attributes extracted from a plurality of attack attribute sources;

FIG. 3 is a flow chart illustrating an exemplary implementation of the feature extraction and feature-based clustering process according to one embodiment of the invention;

FIG. 4 is a flow chart illustrating an exemplary implementation of the clustering routine performed during the processing of FIG. 1 according to one embodiment of the invention;

FIG. 5 is a sample table illustrating a plurality of computer security attacks that have been assigned to a particular cluster;

DETAILED DESCRIPTION

Figure 6:
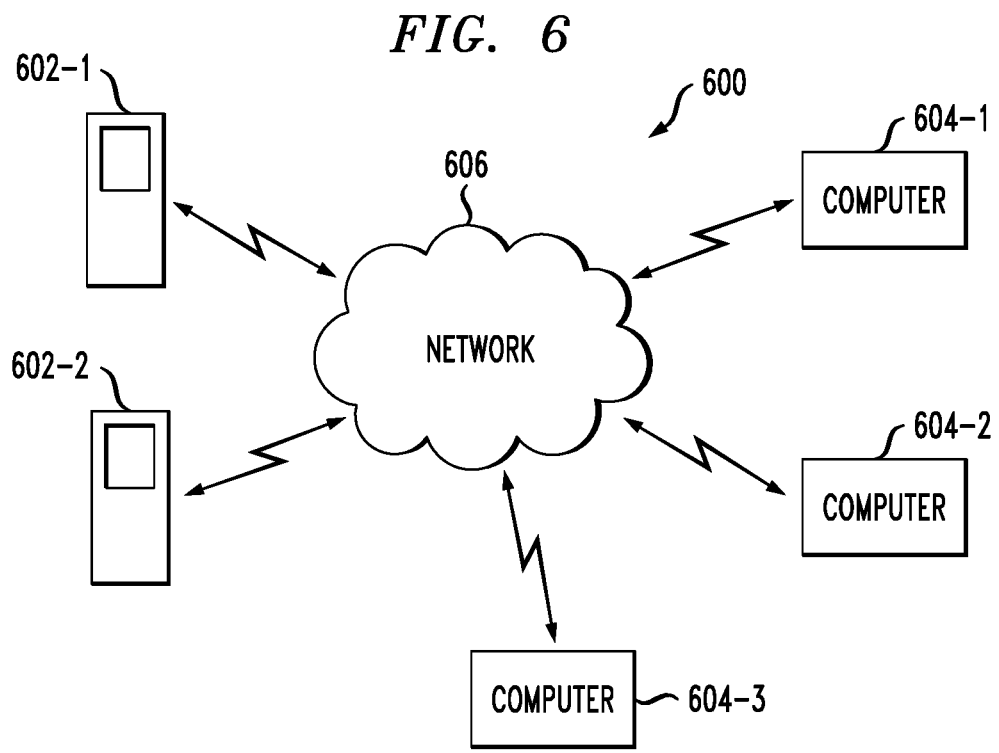
FIG. 6 is a diagram illustrating an example embodiment of communication systems that may incorporate functionality according to one or more embodiments of the invention.

Illustrative embodiments of the present invention will be described herein with reference to exemplary communication systems, computing devices, and associated servers, clients and other processing devices. It is to be appreciated, however, that the invention is not restricted to use with the particular illustrative system and device configurations shown.

As will be described, the present invention in one or more illustrative embodiments provides methods and apparatus for feature-based clustering of attack data to associate a set of computer security attacks with a particular attacker. In one or more exemplary embodiments, attack data (e.g., a phishing URL or malware) for a particular computer security attack is used to extract features of the attack from a plurality of attack attribute sources. An exemplary feature-based clustering process, as discussed further below in conjunction with FIGS. 3 and 4, then assigns the computer security attack to an existing attacker cluster or creates a new attacker cluster, if needed. A plurality of attacker clusters are obtained, where each cluster comprises the computer security attacks of a particular attacker.

FIG. 1 illustrates an exemplary feature extraction and feature-based clustering module 100 in accordance with one embodiment of the invention. The exemplary feature extraction and feature-based clustering module 100 may be embodied as any kind of computing device, such as, for example, a personal computer, a workstation, a server, an enterprise server, a laptop computer, a mobile computer, a smart phone, and a tablet computer.

As shown in FIG. 1, the exemplary feature extraction and feature-based clustering module 100 processes attack data 110 (e.g., phishing URLs and/or malware), as well as a plurality of attributes 120 from a plurality of attack attribute sources 130 (as discussed further below in conjunction with FIG. 2).

As discussed further below in conjunction with FIGS. 3 and 4, the exemplary feature extraction and feature-based clustering module 100 implements an exemplary feature extraction and feature-based clustering process 300 that assigns the computer security attack to an existing attacker cluster 180 or creates a new attacker cluster 180, if needed. A plurality of attacker clusters 180 are obtained, where each cluster comprises the computer security attacks of a particular attacker. The attacker clusters 180 can be used, for example, to investigate one or more attackers and to obtain additional information regarding an attacker.

FIG. 2 is a sample table 200 indicating a listing of attributes 120 extracted from a plurality of attack attribute sources 130. For example, in the case of phishing attacks, the exemplary attack attribute sources 130 may comprise the phishing email message 130-1 associated with the computer security attack; the phishing URL 130-2 associated with the computer security attack; the phishing kit 130-3 associated with the computer security attack; intelligence 130-4 from the RSA FraudAction™; the phishing history 130-5 from the RSA Anti-Fraud Command Center™ (AFCC); and the RSA eFraudNetwork™ 130-6.

A phishing kit 130-3 is a collection of tools used by an attacker to launch a phishing effort. A phishing kit 130-3 typically includes Web site development software, with graphics, coding, and content that can be used to create convincing imitations of legitimate web sites, and spamming software to automate the mass mailing process. Some phishing kits 130-3 include lists of e-mail addresses.

Generally, RSA FraudAction™ is a service of RSA, The Security Division of EMC, based in Hopkinton, Mass. RSA FraudAction™ addresses online phishing and Trojan attacks as well as rogue applications with monitoring and detection, real-time alerts, forensics and countermeasures, and site blocking and shutdown. The RSA FraudAction™ comprises a database that contains information from underground forums and markets that allow further research of an attacker and increase the number of indicators on that attacker.

The RSA Anti-Fraud Command Center™ is a service of RSA, The Security Division of EMC, based in Hopkinton, Mass., that addresses online fraud threats such as phishing, pharming and Trojan attacks on behalf of RSA customers. The RSA eFraudNetwork Service™ (eFN) is a service of RSA, The Security Division of EMC, based in Hopkinton, Mass., that can be used to identify and track fraudulent profiles, patterns and behaviors. The RSA eFraudNetwork Service™ is a cross-institutional, cross-platform, international online fraud network.

As shown in FIG. 2, the sample table 200 illustrates a plurality of exemplary attributes 120 extracted from the exemplary attack attribute sources 130. For example, for the phishing email message source 130-1, the extracted attributes 120 comprise a sender email address, a phishing URL and headers (e.g., from, date, subject). For the exemplary phishing URL source 130-2, the extracted attributes 120 comprise a phishing kit (archived); required input fields; number of pages; WHOIS Records (such as Internet Protocol (IP) address, Internet Service Provider, location and domain); hypertext markup language (HTML) records (such as zip and hash); and the redirection URL.

For the exemplary phishing kit source 130-3, the extracted attributes 120 comprise a zip, hash and directory tree; and email addresses (which act as the drop zone). For the exemplary RSA FraudAction™ Intelligence source 130-4, the extracted attributes 120 comprise email address; and IP address.

For the exemplary phishing history 130-5 from the Anti-Fraud Command Center™ source, the extracted attributes 120 comprise the phishing URL. For the exemplary RSA eFraudNetwork™ source 130-6, the extracted attributes 120 comprise a suspect IP address.

FIG. 3 is a flow chart illustrating an exemplary implementation of the feature extraction and feature-based clustering process 300 according to one embodiment of the invention. As shown in FIG. 3, the exemplary feature extraction and feature-based clustering process 300 initially obtains attack data (e.g., a phishing URL or malware) for a given attack during step 310.

The feature extraction and feature-based clustering process 300 then extracts features of the given attack from the collected attributes 120 during step 320, as discussed above in conjunction with FIG. 2.

During step 330, the exemplary feature extraction and feature-based clustering process 300 employs an exemplary clustering routine 400, as discussed further below in conjunction with FIG. 4, to add the given attack to an existing attacker cluster 180 or create a new attacker cluster 180. In this manner, the feature extraction and feature-based clustering process 300 updates the clusters 180 of attacks (clustered by attacker).

In the case of an exemplary phishing attack, after extracting the relevant features from the available attributes 120 during step 320 for the new phishing URL, the exemplary clustering routine 400 applies several comparison techniques against features of the new URL and previously identified clusters 180 to assign the URL to a cluster.

FIG. 4 is a flow chart illustrating an exemplary implementation of the clustering routine 400 performed during step 330 of FIG. 3, according to one embodiment of the invention. As shown in FIG. 4, the exemplary clustering routine 400 initially obtains the features extracted for the given attack during step 320. The extracted features are normalized during step 410. For example, each of the features similarity measures can be normalized into a 0-100 scale.

An attack score is computed during step 420 using the following equation:

$$\text{SimilarityScore(URL,ClusterRepURL)} = \Sigma \alpha_i * \text{StrongFeatureSimilarityScore}_i + \Sigma \beta_i * \text{WeakFeatureSimilarityScore}_i$$

Generally, the above equation represents an algorithm to calculate a similarity score between the given URL and each cluster representative URL (ClusterRepURL). $\alpha_i$ is a weight of the i'th strong feature and $\beta_i$ is the weight of the i'th weak feature.

In one or more exemplary embodiments, an attribute comprises the collected raw data, while a feature is a manipulation of the raw data so that it can be applied to the above equation. Each extracted feature is classified as being a strong similarity indicator or a weak similarity indicator. For example, strong similarity indicators may comprise a drop email from the phishing kit 130-3, the redirection URL from the phishing URL 130-2 and message digest (MD5) of the phishing kit 130-3. In addition, a set of week similarity indicators may comprise a URL structure and a message digest of the first web page MD5.

In one exemplary implementation, the following well-known comparison techniques are employed: exact match, Ratcliff/Obershelp, Trigram, Hamming distance and Levenshtein distance. Each comparison technique is classified as having a high or low similarity threshold. For example, an exact match comparison technique can be classified as a very high similarity threshold. A particular high similarity comparison technique is used to compare two strong features to obtain a score and a particular low similarity comparison technique is used to compare two weak features to obtain a score.

The exemplary comparison techniques, such as the exact match comparison technique, can be used to detect an email change from AAAthingss@gmail.com to AAAthingsss@gmail.com.

A test is performed during step 430 to determine if the computed attack score exceeds a predefined threshold for a given cluster 180. If it is determined during step 430 that the computed attack score is larger than the predefined threshold for at least one given cluster 180, then the current phishing URL is assigned to the given cluster during step 440. If, however, it is determined during step 430 that the computed attack score is not larger than the predefined threshold for at least one given cluster 180, then a new cluster 180 is created during step 450 for the given attack.

In the event that the current phishing URL is similar to several clusters 180, the clustering routine 400 can re-evaluate all of the phishing URLs in those clusters 180 to see if they should be in the same group.

FIG. 5 is a sample table 500 illustrating a plurality of exemplary phishing attacks that have been assigned to a particular cluster. As shown in FIG. 5, the sample table 500 comprises a plurality of records, each associated with a different phishing attack. For each phishing attack, the sample table 500 indicates the phishing URL in field 510, an identifier in field 520, such as a metropolis identifier, one or more emails associated with the attack in field 530, and an IP address associated with the attack in field 540. It is noted that an indication of "nan" indicates that an email address was not available.

The highlighted records in FIG. 5 associated with attacks having identifiers 1, 2, 4, 5, 8 and 9 were assigned to the cluster based on an email similarity. In addition, the records associated with attacks having identifiers 3, 6 and 7 were assigned to the cluster based on a partial URL similarity. For example, record 3 was assigned to the cluster based on the URL portion "grupocolba.com/modules/mod_wrapper", and records 6 and 7 were assigned to the cluster based on the URL domain portion "phonebooker.co.uk" and phishing kit path "navy2015new/logon.html".

In the case of malware, the attack data applied in step 310 comprises information that can be extracted from the malware and its configuration files. For example, the attack data can comprise an encryption key of the malware and a domain registrant email of the malware (which are two strong indicators). In the case of an encryption key, the exemplary clustering routine 400 clusters together cases that use the same encryption key. If malware does not have an encryption key or use a family default key, the domain registrant email can be employed. Many malware attacks register a domain to be used as part of the infrastructure. If the malware uses a hijacked web site, domain registration details can be analyzed. Records that use domain privacy services can be filtered. The exemplary clustering routine 400 clusters by these registration details (i.e., registrant email address). It is noted that clustering email addresses together is based on syntax and contextual similarities.

A uniform resource identifier (URI) (or a portion thereof) of malware can also be used for clustering malware attacks. URIs may be repetitive but have unique folder names. In at least one embodiment, URI is classified as a weak indicator.

If available, information about the malware can also be extracted from a command and control server (e.g., user names, passwords, reports-folder name, jabber information, MySQL information and additional information).

Among other benefits, one or more embodiments of the invention operate without human intervention due to the machine learning techniques present in the processes of FIGS. 3 and 4. In addition, one or more embodiments of the invention aggregate large databases of phishing and malware attacks on numerous entities making the attribution process more accurate. By correlating the attacks over time and across organizations, a larger amount of attacker characteristics are obtained which might be useful for further investigation and/or cooperation with law enforcement agencies.

As noted above, one or more exemplary embodiments of the invention are immune to small changes in the attacker attributes, such as an email change from AAAthingss@gmail.com to AAAthingsss@gmail.com, since all the attributes 120, which were derived from various sources 130, are evaluated in an iterative process of clustering and enrichment and update the attacker profiles 180 for better accuracy.

One or more exemplary embodiments of the invention allow an organization to focus their response efforts on those attackers that cause the most damage. With the ability to connect separated phishing and/or malware attacks into a single cluster representing an attacker, the organization can map all of the possible attackers and assign a severity/priority to each of them for further analysis.

FIG. 6 is a diagram illustrating an example embodiment of communication systems that may incorporate functionality according to one or more embodiments of the invention. As described herein, authentication techniques of the type associated with one or more embodiments of the invention may be implemented in a wide variety of different applications. By way merely of illustration, one exemplary communication system application that may incorporate such techniques will now be described with reference to FIG. 6.

As depicted in FIG. 6, a communication system 600 comprises a plurality of mobile devices 602-1 and 602-2 and computers 604-1, 604-2 and 604-3, configured to communicate with one another over a network 606. Any two or more of the devices 602 and 604 may correspond to devices (such as the feature-based clustering module 100 in FIG. 1) configured to implement at least one embodiment of the invention, as described herein. It is also to be appreciated, however, that the techniques disclosed herein can be implemented in numerous other applications. For example, while FIG. 6 depicts network 606 as a wireless network, it is to be appreciated that one or more embodiments of the invention can be implemented in connection with a wired network.

Further, aspects of the present invention are described herein with reference to flowchart illustrations, communication diagrams and/or block diagrams of methods, apparatus, systems and computer program products according to embodiments of the invention. It is to be appreciated that each block of the flowchart illustrations and/or block diagrams, and combinations of blocks in the flowchart illustrations and/or block diagrams, can be implemented by computer program instructions. These computer program instructions may be provided to a processor of a special purpose computer or other specialized programmable data processing apparatus to produce a machine, such that the instructions, which execute via the processor of the computer or other specialized programmable data processing apparatus, implement the functions/acts specified in the flowchart and/or block diagram block or blocks.

As further described herein, such computer program instructions may also be stored in a computer readable medium that can direct a computer, other programmable devices to function in a particular manner, such that the instructions stored in the computer readable medium produce an article of manufacture including instructions which implement the function/act specified in the flowchart and/or block diagram block or blocks. Accordingly, as further detailed below, at least one embodiment of the invention includes an article of manufacture tangibly embodying computer readable instructions which, when implemented, cause a device to carry out techniques described herein.

The computer program instructions may also be loaded onto a computer or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart, communication diagrams and block diagrams in the figures illustrate the architecture, functionality, and operation of possible implementations of systems, methods and computer program products according to various embodiments of the present invention. In this regard, each block in the flowchart, communication diagrams or block diagrams may represent a component, segment, or portion of code, which comprises at least one executable instruction for implementing the specified logical function(s). It should be noted that the functions noted in the block may occur out of the order noted in the figures.

Additionally, the techniques detailed herein can also be implemented via a computer program product that includes computer useable program code stored in a computer readable storage medium in a data processing system, wherein the computer useable program code was downloaded over a network from a remote data processing system. The computer program product can also include, for example, computer useable program code that is stored in a computer readable storage medium in a server data processing system, wherein the computer useable program code is downloaded over a network to a remote data processing system for use in a computer readable storage medium with the remote system.

As will be appreciated by one skilled in the art, aspects of the present invention may take the form of an entirely hardware embodiment, an entirely software embodiment (including firmware, resident software, micro-code, etc.) or an embodiment combining software and hardware aspects that may be referred to herein as a "system."

Figure 7:
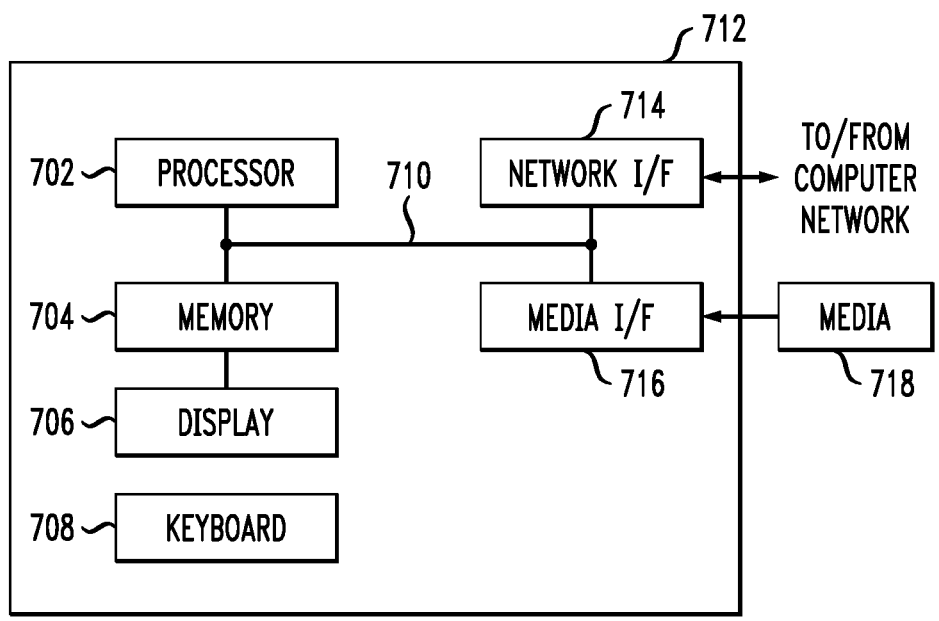
FIG. 7 is a system diagram of an exemplary device on which at least one embodiment of the invention can be implemented.

FIG. 7 is a system diagram of an exemplary device (such as the feature-based clustering module 100 in FIG. 1, for example) on which at least one embodiment of the invention can be implemented. As depicted in FIG. 7, an example implementation employs, for example, a processor 702, a memory 704, and an input/output interface formed, for example, by a display 706 and a keyboard 708. The term "processor" as used herein can include one of multiple processing device(s), such as, for example, one that includes a central processing unit (CPU), a microprocessor, a microcontroller, an application-specific integrated circuit (ASIC), a field-programmable gate array (FPGA), and/or other forms of processing circuitry. The term "memory" includes memory associated with a processor or CPU, such as, for example, random access memory (RAM), read only memory (ROM), a fixed memory device (for example, a hard drive), a removable memory device (for example, a diskette), a flash memory, etc. Further, the phrase "input/output interface," as used herein, includes a mechanism for inputting data to the processing unit (for example, a graphical user interface) and a mechanism for providing results associated with the processing unit (for example, a display).

The processor 702, memory 704, and input/output interface such as display 706 and keyboard 708 can be interconnected, for example, via bus 710 as part of a data processing unit 712. Suitable interconnections via bus 710, can also be provided to a network interface 714 (such as a network card), which can be provided to interface with a computer network, and to a media interface 716 (such as a diskette or compact disc read-only memory (CD-ROM) drive), which can be provided to interface with media 718.

Accordingly, computer software including instructions or code for carrying out the techniques detailed herein can be stored in associated memory devices (for example, ROM, fixed or removable memory) and, when ready to be utilized, loaded in part or in whole (for example, into RAM) and implemented by a CPU. Such software can include firmware, resident software, microcode, etc.

As noted above, a data processing system suitable for storing and/or executing program code includes at least one processor 702 coupled directly or indirectly to memory elements 704 through a system bus 710. The memory elements can include local memory employed during actual implementation of the program code, bulk storage, and cache memories which provide temporary storage of at least some program code in order to reduce the number of times code must be retrieved from bulk storage during implementation. Also, input/output (I/O) devices such as keyboards 708, displays 706, and pointing devices, can be coupled to the system either directly (such as via bus 710) or through intervening I/O controllers.

Network adapters such as network interface 714 (for example, a modem, a cable modem, an Ethernet card, etc.) can also be coupled to the system to enable the data processing system to become coupled to other data processing systems or remote printers or storage devices through intervening private or public networks.

As used herein, a "server" includes a physical data processing system (such as system 712 as depicted in FIG. 7) running a server program. It will be understood that such a physical server may or may not include a display and keyboard.

As noted, at least one embodiment of the invention can take the form of a computer program product embodied in a computer readable medium having computer readable program code embodied thereon. As will be appreciated, multiple combinations of computer readable media may be utilized. The computer readable medium can include a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing.

Examples include an electrical connection having one or more wires, a portable computer diskette, a hard disk, RAM, ROM, an erasable programmable read-only memory (EPROM), flash memory, an optical fiber, a portable CD-ROM, an optical storage device, a magnetic storage device, and/or any suitable combination of the foregoing. More generally, a computer readable storage medium may be any tangible medium that can contain, or store a program for use by or in connection with an instruction execution system, apparatus, or device.

Additionally, a computer readable signal medium may include a propagated data signal with computer readable program code embodied therein, for example, in baseband or as part of a carrier wave. Such a propagated signal may take any of a variety of forms such as, for example, electromagnetic, optical, or a suitable combination thereof. More generally, a computer readable signal medium may be any computer readable medium that is not a computer readable storage medium and that can communicate, propagate, or transport a program for use by or in connection with an instruction execution system, apparatus, or device.

Program code embodied on a computer readable medium can be transmitted using an appropriate medium such as, for example, wireless, wireline, optical fiber cable, radio frequency (RF), and/or a suitable combination of the foregoing. Computer program code for carrying out operations in accordance with one or more embodiments of the invention can be written in any combination of at least one programming language, including an object oriented programming language, and conventional procedural programming languages. The program code may execute entirely on a user's computer, partly on a user's computer, as a stand-alone software package, partly on a user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In light of the above descriptions, it should be understood that the components illustrated herein can be implemented in various forms of hardware, software, or combinations thereof, for example, application specific integrated circuit (s) (ASICS), functional circuitry, an appropriately programmed digital computer with associated memory, etc.

Terminology used herein is for the purpose of describing particular embodiments only and is not intended to be limiting of the invention. For example, the singular forms "a," "an" and "the" are intended to include the plural forms as well, unless clearly indicated otherwise. It will be further understood that the terms "comprises" and/or "comprising," as used herein, specify the presence of stated features, steps, operations, elements, and/or components, but do not preclude the presence or addition of another feature, step, operation, element, component, and/or group thereof.

Also, it should again be emphasized that the above-described embodiments of the invention are presented for purposes of illustration only. Many variations and other alternative embodiments may be used. For example, the techniques are applicable to a wide variety of other types of communication systems and computing devices that can benefit from the disclosed attacker attribution techniques. Accordingly, the particular illustrative configurations of system and device elements detailed herein can be varied in other embodiments. These and numerous other alternative embodiments within the scope of the appended claims will be readily apparent to those skilled in the art.

What is claimed is:

1. A method comprising:
   obtaining attack data for a given computer security attack;
   extracting a plurality of features of said given computer security attack from a plurality of attributes of said given computer security attack collected from a plurality of attack attribute sources;
   computing, using at least one processing device, a feature-based score for said given computer security attack based on said extracted features of said given computer security attack relative to each of a plurality of attack clusters, wherein each attack cluster is comprised of a plurality of attacks performed by a particular attacker;
   assigning, using said at least one processing device, said given computer security attack to a given attack cluster if said feature-based score for said given computer security attack satisfies one or more predefined score criteria such that said plurality of attack clusters comprises substantially only said plurality of attacks performed by said corresponding particular attacker; and
   providing, using said at least one processing device, said plurality of attack clusters each substantially comprised of said plurality of attacks performed by said particular attacker.

2. The method of claim 1, wherein said given computer security attack comprises one or more of a malware attack and a phishing attack and wherein said obtained attack data comprises one or more of malware associated with said malware attack and a phishing URL, respectively.

3. The method of claim 1, wherein said attributes of said given computer security attack comprise one or more of a sender email address, a phishing uniform resource locator (URL), email header information, a phishing kit, required phishing input fields; a number of pages on a phishing site; Internet Protocol (IP) address, Internet Service Provider of a URL, location of URL, domain of a URL, hypertext markup language (HTML) records, redirection URL, phishing kit information, drop zone email address, and a suspect IP address.

4. The method of claim 1, wherein said one or more predefined score criteria comprise said feature-based score for said given computer security attack exceeding a predefined threshold.

5. The method of claim 1, wherein said one or more predefined score criteria comprise said feature-based score for said given computer security attack relative to said given attack cluster having a maximum value relative to said feature-based scores for said given computer security attack for said plurality of attack clusters.

6. The method of claim 1, further comprising the step of creating a new attack cluster for said given computer security attack if said feature-based score for said given computer security attack does not satisfy one or more predefined score criteria for said plurality of attack clusters.

7. The method of claim 1, further comprising the step of reevaluating at least a subset of said plurality of attack clusters if said given computer security attack is similar to said subset of attack clusters.

8. The method of claim 1, wherein said feature-based score for said given computer security attack aggregates a feature score for a plurality of said extracted features of said given computer security attack based on a comparison to a corresponding feature of said given attack cluster.

9. The method of claim 8, wherein said feature-based score for said given computer security attack aggregates a feature score for a first group of said extracted features separately from a feature score for a second group of said extracted features.

10. The method of claim 9, wherein a first set of predefined comparison techniques are applied for said first group of extracted features and a second set of predefined comparison techniques are applied for said second group of extracted features.

11. A system, comprising:
a memory; and
at least one processing device, coupled to the memory, operative to:
obtain attack data for a given computer security attack;
extract a plurality of features of said given computer security attack from a plurality of attributes of said given computer security attack collected from a plurality of attack attribute sources;
compute, using at least one processing device, a feature-based score for said given computer security attack based on said extracted features of said given computer security attack relative to each of a plurality of attack clusters, wherein each attack cluster is comprised of a plurality of attacks performed by a particular attacker;
assign, using said at least one processing device, said given computer security attack to a given attack cluster if said feature-based score for said given computer security attack satisfies one or more predefined score criteria such that said plurality of attack clusters comprises substantially only said plurality of attacks performed by said corresponding particular attacker; and
provide, using said at least one processing device, said plurality of attack clusters each substantially comprised of said plurality of attacks performed by said particular attacker.

12. The system of claim 11, wherein said given computer security attack comprises one or more of a malware attack and a phishing attack and wherein said obtained attack data comprises one or more of malware associated with said malware attack and a phishing URL, respectively.

13. The system of claim 11, wherein said one or more predefined score criteria comprise said feature-based score for said given computer security attack exceeding a predefined threshold.

14. The system of claim 11, wherein said one or more predefined score criteria comprise said feature-based score for said given computer security attack relative to said given attack cluster having a maximum value relative to said feature-based scores for said given computer security attack for said plurality of existing attack clusters.

15. The system of claim 11, wherein said at least one processing device is further configured to create a new attack cluster for said given computer security attack if said feature-based score for said given computer security attack does not satisfy one or more predefined score criteria for said plurality of attack clusters.

16. The system of claim 11, wherein said at least one processing device is further configured to reevaluate at least a subset of said plurality of attack clusters if said given computer security attack is similar to said subset of attack clusters.

17. The system of claim 11, wherein said feature-based score for said given computer security attack aggregates a feature score for a plurality of said extracted features of said given computer security attack based on a comparison to a corresponding feature of said given attack cluster.

18. An article of manufacture comprising a non-transitory machine readable recordable medium containing one or more programs which when executed by at least one processing device implement the steps of:
obtaining attack data for a given computer security attack;
extracting a plurality of features of said given computer security attack from a plurality of attributes of said given computer security attack collected from a plurality of attack attribute sources;
computing, using at least one processing device, a feature-based score for said given computer security attack based on said extracted features of said given computer security attack relative to each of a plurality of attack clusters, wherein each attack cluster is comprised of a plurality of attacks performed by a particular attacker;
assigning, using said at least one processing device, said given computer security attack to a given attack cluster if said feature-based score for said given computer security attack satisfies one or more predefined score criteria such that said plurality of attack clusters comprises substantially only said plurality of attacks performed by said corresponding particular attacker; and
providing, using said at least one processing device, said plurality of attack clusters each substantially comprised of said plurality of attacks performed by said particular attacker.

19. The article of manufacture of claim 18, wherein said given computer security attack comprises one or more of a malware attack and a phishing attack and wherein said obtained attack data comprises one or more of malware associated with said malware attack and a phishing URL, respectively.

20. The article of manufacture of claim 18, wherein said one or more predefined score criteria comprise said feature-based score for said given computer security attack exceeding a predefined threshold.

21. The article of manufacture of claim 18, further comprising the step of reevaluating at least a subset of said plurality of attack clusters if said given computer security attack is similar to said subset of attack clusters.

22. The article of manufacture of claim 18, wherein said feature-based score for said given computer security attack aggregates a feature score for a plurality of said extracted features of said given computer security attack based on a comparison to a corresponding feature of said given attack cluster.

\* \* \* \* \*